Dec. 20, 1960   W. A. PORTER ET AL   2,964,903
THERMAL POSITIONING DEVICE
Filed May 9, 1958
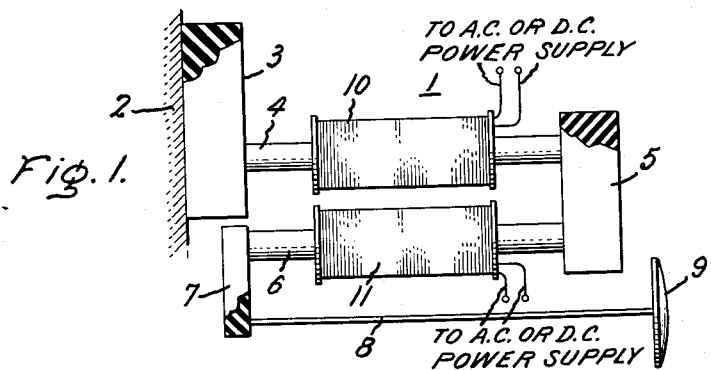
Fig. 1.
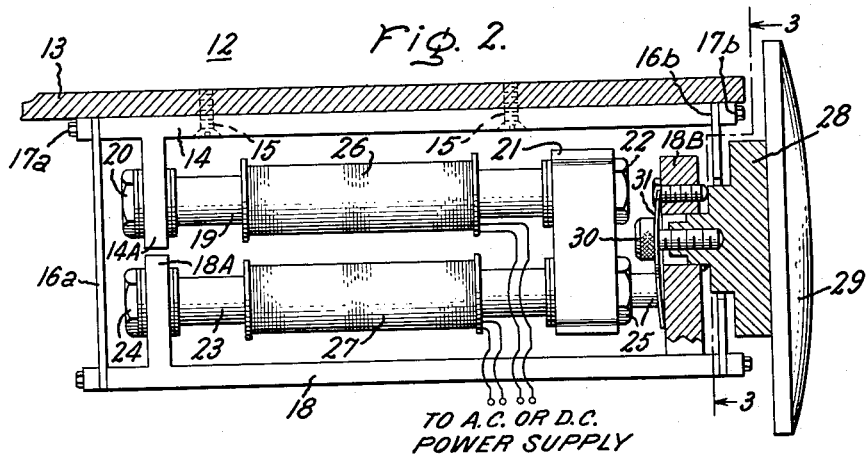
Fig. 2.
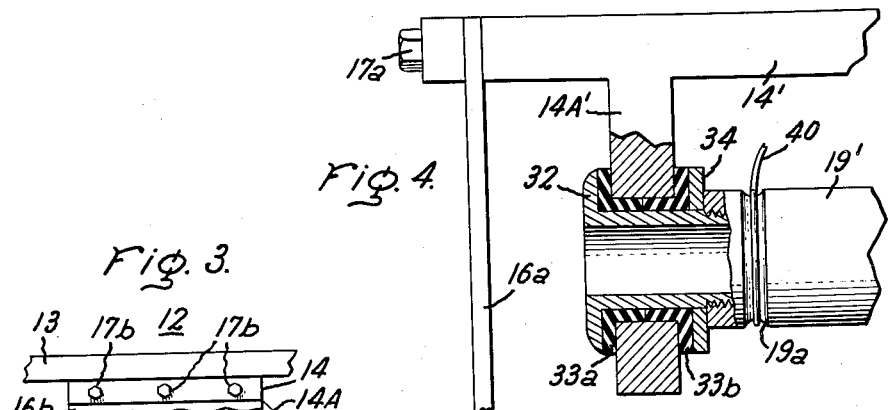
Fig. 3.
Fig. 4.
Inventors:
William A. Porter,
James L. Good Jr.,
by Allen E. Amgott
Their Attorney.

United States Patent Office 2,964,903
Patented Dec. 20, 1960

1

2,964,903

THERMAL POSITIONING DEVICE

William Asbury Porter and James Lester Good, Jr., Ithaca, N.Y., assignors to General Electric Company, a corporation of New York Filed May 9, 1958, Ser. No. 734,365

7 Claims. (Cl. 60—23)

This invention relates generally to positioning equipment, and more particularly to a thermally actuated device for accurately producing minute linear motions.

In certain airborne weapons systems, it is necessary to develop forces for use in positioning devices such as mirrors, lenses, and the like. Where mechanical couplings such as gears or lead-screws are relied upon to develop these forces, the amount of backlash inherently present in such systems comprises a serious disadvantage. The microphonics occasioned by relative motion between the moving parts in the mechanical coupling forms an equally objectionable feature in such systems.

In addition, the problem of overcoming static friction in prior art positioning equipment often causes an extremely unsatisfactory relationship between the magnitude of an applied force and the resultant displacement. Since a body at rest is incapable of movement until the applied force exceeds the value of the force due to static friction, an undesirable "overshoot" frequently results from the application of sufficient force to initiate the movement of the positioning equipment. This is because the quantity of force required to maintain motion is barely larger than the force due to dynamic friction, which is usually significantly less than the static friction force. From the foregoing discussion, it will be evident that the provision for a positioning device free of characteristic problems such as backlash, static friction and other objectionable features would be of inestimable value in the art of airborne weapons instrumentation and similar type systems.

Accordingly, therefore, the present invention contemplates ingenious apparatus for exploiting thermal expansion to accomplish the minute displacements in a manner which entirely eliminates problems caused by static friction. Moreover, by arranging thermally expansible elements to directly support a mirror or similar device which is to be deflected, the problem of backlash is obviated. By using a pair of elongated thermally expansible rods or tubes, the present invention produces a rugged positioning device characterized by extreme simplicity, low bulk and weight, and substantial immunity from undesirable changes in position as a result of variations in the ambient temperature.

Accordingly, therefore, a primary object of the invention is to provide a thermally actuated positioning device capable of effecting extremely small and precise displacements.

Another object of the invention is to teach structure capable of exploiting the coefficient of linear expansion of materials in accurately positioning elements in an airborne weapons system.

Still another object of the invention is to teach a novel assembly for selectively causing extremely minute positional changes in an optical element or the like.

A further object of this invention is to disclose a compensated thermal positioning device capable of operation in environments characterized by extreme temperature changes without experiencing unwanted linear displacements as a result of the variations in ambient temperature.

These and other objects and advantages of the present invention will become apparent by referring to the accompanying detailed description and drawings, in which like numerals indicate like parts, and in which:

Figure 1 illustrates a diagrammatic sketch used for the purpose of explaining the theory of the invention.

Figure 2 shows a structural embodiment of the invention which uses exciting coils for inducing heat energy in the expansible elements employed in practicing the invention.

Figure 3 is a sectional view taken along the lines 3—3 in Figure 2 and looking in the direction of the arrows.

Figure 4 comprises a fragmentary sectional view of the parts used to secure the ends of the expansible elements included in the inventive structure when resistive heating is relied upon.

Turning now to the drawings, and more particularly to Figure 1 thereof, the numeral 1 has been used in this figure to designate generally a combination of components and elements employed in explaining the theory of the invention. In this figure, the reference numeral 2 designates a fixed or immobile support surface. To this surface there is affixed a block 3 of thermal insulating material. Immediately adjacent the block 3 there is provided an expansible rod or tube 4 which is disposed to enter and terminate within the block 3. The rod or tube 4 is fabricated of material having an accurately predetermined coefficient of linear expansion, such as Nichrome, or the like. At the opposite end of the rod or tube 4, there is provided a cross-bar 5 comprised of a block of suitable thermal insulating material, and the tube 4 will be seen to terminate therein.

A second expansible rod or tube 6 will be seen to similarly enter and terminate within the cross-bar 5. The opposite end of the tube 6 terminates in another block 7 comprised of thermally insulative material. The block 7 is mounted to rigidly grasp and impart motion to a linkage rod 8 to which there is affixed an optical element 9, such as a mirror, lens, or other device requiring accurately controlled linear deflections. In order to induce thermal activity within the expansible rods 4 and 6 in Figure 1, there is provided a pair of exciting coils 10 and 11 disposed respectively therearound. Each of the coils 10 and 11 may be selectively connected in turn to a source of alternating current energy. The resultant alternating flux which threads the expansible elements gives rise to thermal activity therewithin, in accordance with conventional eddy current phenomena, and effects a resulting linear expansion. In addition, the $I^2R$ loss in coils 10 and 11 contributes to the linear expansion of the expansible rods when alternating current energy is employed. Alternatively, coils 10 and 11 may be selectively connected in turn to a source of direct current energy. The resultant $I^2R$ loss due to the current flow through the coil produces heat and effects a resulting linear expansion of expansible rods.

When only coil 10 is thus energized, the rod 4 expands linearly to the right. This deflects the cross-bar 5, the rod 6 and the insulating block 7 as a unit in the same direction. This displacement of block 7, of course, similarly urges the linkage rod 8 and optical element 9 to the right.

When coil 11 is energized, the expansion of rod 6 forces the insulating block 7 slightly to the left. Consequently, the optical element 9 and the linkage rod 8 are both forced to assume a new position slightly to the left of their former location. It should be appreciated that the accurately controlled linear displacements discussed immediately above are effected only as required, and that the inventive assembly is substantially insensitive to changes in the ambient temperature. Thus, the operation of the device in an airborne weapon system or the like is eminently satisfactory because of the inability of increasing or decreasing temperature to alter the predetermined spacing of the optical element. Since the changes in ambient temperature which occur with increases in altitude cause the expansible rods 4 and 6 to move in exactly opposite directions by equal amounts, the spatial position of the optical element 9 remains essentially constant.

Turning now to Figure 2, the numeral 12 has been used to indicate generally an embodiment of the invention which utilizes the theory explained in conjunction with Figure 1. In this embodiment, the numeral 13 has been used to designate a support member such as a bulkhead or other structural component of an aircraft. To this support member there is secured a fixed base member 14 comprised of a material which is characterized by good thermally insulative characteristics. The base member may be secured to the support member 13 by means of machine screws 15, or other equally suitable fastening means. The fixed base member 14 will be seen to include a downwardly projecting portion 14A.

At the left end of base member, there is provided a resilient reed 16a which is affixed to the support member 14 by means of a suitable fastening device 17a, such as a machine screw, a rivet, or other equally appropriate means. In the right hand portion of Figure 2, there is shown a second resilient reed 16b similarly secured to the base member 14 by a fastening device 17b. The device 17b may comprise a suitable machine screw, rivet or the like.

In the lower portion of Figure 2, the assembly will be seen to include a movable base member 18. The member 18 is fabricated of a material which is characterized by good thermally insulative characteristics. The member 18 also includes a first upwardly extending portion 18A in the left hand portion and a second portion 18B upwardly extending from the right hand portion thereof. The member 18 is secured within the reeds 16a and 16b in the same manner as earlier described in conjunction with the fixed member 14.

In the upper portion of Figure 2, there is depicted a first expansible tube 19 secured at its left end to the portion 14A by means of a machine screw or bolt 20. The opposite end of the tube 19 terminates within a cross-bar 21 comprised of thermally insulating material, and is affixed thereto by means of a screw or bolt 22. It will be appreciated that one or more suitable annular washers, comprised of good thermally insulating material, may be positioned at the opposite ends of the expansible tube 19 in order to assist in preventing undersired heat loss therefrom.

Directly below the first expansible tube 19, there is shown a second expansible tube 23 which terminates within the portion 18A extending upwardly from the movable base member 18. The tube 23 is secured within the portion 18A by means of a suitable machine screw or bolt 24. The right end of expansible tube 23 terminates within the cross-bar 21 and is firmly secured therewithin by means of a hollow tubular screw 25. The screw 25 includes an axially extending portion which is shrunk or press-fitted into a suitable hole provided in the upwardly extending portion 18B of movable frame 18. The external appearance and configuration of the tubular screw 25 in relationship to portion 18B is perhaps seen most clearly in the sectional view provided in Figure. 3.

Returning now to Figure 2, the numeral 26 has been used to identify an exciting coil mounted to encircle the expansible tube 19. A second exciting coil 27 is mounted to encircle and generate heat energy within the expansible tube 23. The time response for expansion of tubes 19 and 23 can be increased or decreased by adjustment of spacing between coils 26 and 27 and said tubes. Although the configuration shown in Figure 2 is characterized by extremely rapid response times, it is possible to obtain a more rapid time constant as well as an optimum frequency response by supplying current directly to the expansible tubes, and this aspect of the invention is explained in detail later in the present specification in conjunction with the detailed description of Figure 4.

Returning again to Figure 2, the numeral 28 as used therein identifies a mirror support. To the mirror support 28 there is secured an optical element 29 such as a mirror, a lens or the like. The support 28 includes a first circular portion which loosely penetrates an oversize aperture provided within the reed 16b. A second circular portion of the support 28 enters and is retained within a longitudinally disposed circular bore provided within the upwardly disposed portion 18B. The support 28 is secured in spaced relationship to the portion 18B for simultaneous movement therewith by means of a cap screw 30 and a resilient three pronged spring clip 31. The configuration of the spring clip 31 is indicated most clearly by the dotted lines shown in the sectional view of the invention provided in Figure 3.

Continuing with the detailed description of the invention, and more particularly Figure 4 thereof, the numeral 14' has been used in this Figure to identify a portion of a fixed frame member of the type shown in Figure 2. The frame member 14' is provided with a downwardly extending portion 14A' which generally resembles the corresponding part shown in Figure 2. An internally threaded expansible tube 19' is secured in spaced relationship with respect to the frame member 14' as well as the downwardly extending portion 14A'. The tube 19' is provided with an annular retention groove 19a for the purpose of accommodating a conductive juncture with a current carrying conductor 40.

The internally threaded portion within tube 19' is engaged by a hollow tubular screw 32. The screw 32 is electrically isolated from the downwardly extending portion 14A' by means of a pair of insulating bushings 33a and 33b. Each of the bushings 33a and 33b includes an annular ledge or shoulder and has an axial dimension approximately one-half as long as the thickness of the portion 14A'. An annular insulating washer 34 is used in addition to the bushings to assist in insulating the expansible tube from the frame 14.

Where substantially instantaneous response time is needed to enhance the frequency response of the inventive structure, the form of the invention shown in Figure 4 renders possible the use of $I^2R$ phenomenon. It will be appreciated that where such an $I^2R$ inter-connection is exploited the expansive tubes may each be provided with a retention groove 19a at the respective ends thereof. It will also be appreciated that the type of individual electrical insulating assembly shown in Figure 4 is exploited in securing each of the respective ends of the expansible tubes to the appropriate support frame portions. In substitution for the hollow tubular screw 25 shown in Figure 2, one of the tubular screws 32 shown in Figure 4 is provided with an elongated sleeve which is insulatively secured within the upwardly extending portion 18b.

Returning momentarily to Figure 2 for the purpose of explaining the operation of the invention, it will now be appreciated that the application of current energy, either alternating or direct, to coil 26 occasions an expansion on the part of the tube 19. The cross-bar 21, the tube 23, and the movable support frame 18 are all deflected to the right as a result, because of the fixed position of the left end of tube 19. This deflection is possible because of the resilient reeds 16a and 16b. Since the mirror support 28 is fixedly secured to the portion 18B connected to frame 18, the rightward deflection of this frame causes a similar deflection by the optical element 29.

When alternating or direct current energy is applied to the coil 27, the tube 23 expands linearly to the left. This expansion forces the upwardly extending portion 18A and the associated movable frame 18 to the left. Because of the mechanical connection between mirror support 28 and the frame 18, the optical element 29 is compelled as a result to experience a similar linear displacement to the left. The unrestricted movement of the frame member 18 is in this case again made possible by the utilization of the resilient reeds 16a and 16b within the assembly.

From the foregoing description it is seen that a thermally actuated device has been designed for accurately producing minute linear motions. While particular embodiments of the invention have been shown and described herein, it is not intended that the invention be limited to such disclosures, but that changes and modifications can be made and incorporated within the scope of the claims. Although the invention has been described in conjunction with the movement of an optical element, it will be appreciated that it may be used for accurately providing linear displacements in other systems, and such use would be deemed to fall squarely within the scope of the appended claims.

What I claim is:

1. In a thermal positioning device for precisely displacing an optical element, the combination which includes a fixed base member, a first linear expansible element having an end secured to said fixed base member, a movable base member mounted to relative longitudinal movement with respect to said fixed base member and adapted to support said optical element, a second linear expansible element having an end secured to said movable base member, means for applying thermal energy to at least one of said expansible elements, and insulated crossbar means mounted to secure the other ends of said expansible elements in spaced relationship.

2. In a thermal positioning device for precisely displacing an optical element, the combination which includes fixed support means, movable support means, resilient reed means structurally interconnected between said fixed and movable support means, a first linear expansible tube having an end affixed to said fixed support means, a second linear expansible tube having an end affixed to said movable support means, cross-bar means interconnected between the other ends of said first and second tube means, means mounted to selectively generate thermal energy within either of said expansible tubes, and means positioned with respect to said expansible elements to transmit a force for effecting a precise longitudinal displacement responsive to said generation of said thermal energy within said tube.

3. In a thermal positioning device for precisely displacing an optical element, the combination which includes cross-bar means, a first thermally expansible element having a linear coefficient of expansion provided with a fixed support at one end and secured to said cross-bar means at the opposite end, a second thermally expansible element having a linear coefficient of expansion and having an end secured to said cross-bar means, means mounted on said expansible elements to selectively generate heat energy within said expansible elements, and means adapted to interconnect an end of said second expansible element remote from said cross-bar means to an optical element to impart precise longitudinal displacements.

4. In a thermal positioning device for precisely displacing an optical element, the combination which includes a pair of linear expansible elements, an insulating block interconnected between one end of each of said elements, support means mounted to secure and anchor the other end of one of said elements remote from said insulating block, means connecting the other end of the other of said elements and adapted to impart a longitudinal force to an optical element, and heat producing means disposed in proximity to each of said expansible elements for effecting linear displacements thereby.

5. In a thermal positioning device for precisely displacing an optical element, the combination which includes a pair of linear expansible elements, an insulating block interconnected between one end of each of said elements, support means mounted to secure and anchor the other end of one of said elements remote from said insulating block, means connecting the other end of the other of said elements and adapted to impart a longitudinal force to an optical element, and heat producing means comprising an exciting coil disposed in proximity to each of said expansible elements for effecting linear displacements thereby.

6. In a thermal positioning device for precisely displacing an optical element, the combination which includes a fixed base member, a first linear expansible element having an end secured to said fixed base member, a movable base member mounted for relative longitudinal movement with respect to said fixed base member and adapted to support an optical element, a second linear expansible element having an end secured to said movable base member, insulated cross-bar means mounted to secure the other ends of said expansible elements in spaced relationship, and means including exciting coil means disposed around each of said elements for inducing thermal activity therein.

7. In a thermal positioning device for precisely displacing an optical element, the combination which includes a pair of linear expansible elements, an insulating block interconnected between corresponding one end of each said elements, support means mounted to secure and anchor an end of one of said elements remote from said insulating block, means adapted to connect the other end of the other of said elements to impart a longitudinal force to an optical element, and resistive heat producing means disposed in proximity to each of said expansible elements for effecting linear displacements thereby, said resistive heat producing means comprising a current carrying conductor attached to each of said expansible elements.

References Cited in the file of this patent

UNITED STATES PATENTS

| | | |
|---|---|---|
| 691,692 | Von Zweigbergk | Jan. 21, 1902 |
| 1,217,982 | Neahr | Mar. 6, 1917 |
| 1,543,408 | Whittingham | June 23, 1925 |
| 2,465,119 | Resek et al. | Mar. 22, 1949 |
| 2,598,878 | Ballou | June 3, 1952 |
| 2,712,772 | Trombe | July 12, 1955 |

UNITED STATES PATENT OFFICE
CERTIFICATION OF CORRECTION

Patent No. 2,964,903                      December 20, 1960

William Asbury Porter et al.

It is hereby certified that error appears in the above numbered patent requiring correction and that the said Letters Patent should read as corrected below.

Column 6, lines 42 and 43, for "between corresponding one end of each said elements," read -- between one end of each said elements, --.

Signed and sealed this 13th day of June 1961.

(SEAL)
Attest:

ERNEST W. SWIDER                      DAVID L. LADD
Attesting Officer                      Commissioner of Patents